US012072590B2

(12) United States Patent
Zhang et al.

(10) Patent No.: US 12,072,590 B2
(45) Date of Patent: Aug. 27, 2024

(54) CURVED LIQUID CRYSTAL DISPLAY PANEL AND CURVED DISPLAY DEVICE

(71) Applicants: CHENGDU BOE DISPLAY SCI-TECH CO., LTD., Sichuan (CN); BOE Technology Group Co., Ltd., Beijing (CN)

(72) Inventors: Yanxue Zhang, Beijing (CN); Zhoushuo Chu, Beijing (CN); Yong Zeng, Beijing (CN); Yanru Guo, Beijing (CN); Chao Zhong, Beijing (CN); Lei Qin, Beijing (CN); Zeyu Qu, Beijing (CN); Shuai Li, Beijing (CN); Zhonglin Li, Beijing (CN); Yufeng Bao, Beijing (CN); Yuting Zhang, Beijing (CN)

(73) Assignees: CHENGDU BOE DISPLAY SCI-TECH CO., LTD., Sichuan (CN); BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 18/271,046

(22) PCT Filed: Aug. 22, 2022

(86) PCT No.: PCT/CN2022/113811
§ 371 (c)(1),
(2) Date: Jul. 6, 2023

(87) PCT Pub. No.: WO2023/025072
PCT Pub. Date: Mar. 2, 2023

(65) Prior Publication Data
US 2024/0069395 A1 Feb. 29, 2024

(30) Foreign Application Priority Data
Aug. 27, 2021 (CN) .......................... 202110998013.2

(51) Int. Cl.
G02F 1/1362 (2006.01)
G02F 1/1333 (2006.01)
(Continued)

(52) U.S. Cl.
CPC .. *G02F 1/136222* (2021.01); *G02F 1/133302* (2021.01); *G02F 1/339* (2013.01); *G02F 1/13458* (2013.01)

(58) Field of Classification Search
CPC .......................... G02F 1/13452; G02F 1/13458
See application file for complete search history.

(56) References Cited

U.S. PATENT DOCUMENTS

2013/0271710 A1 10/2013 Tatemura et al.
2014/0065430 A1\* 3/2014 Yamazaki .............. H10K 71/00
445/25
(Continued)

FOREIGN PATENT DOCUMENTS

CN 1916716 A 2/2007
CN 103810942 A 5/2014
(Continued)

*Primary Examiner* — Alexander P Gross
(74) *Attorney, Agent, or Firm* — IPro, PLLC

(57) ABSTRACT

Provided is a curved liquid crystal display panel, including a color film substrate and an array substrate. An orthographic projection of the color film substrate on the array substrate is within the array substrate. The color film substrate includes a first side surface and a second side surface. The array substrate includes a third side surface and a fourth side surface. The first side surface is adjacent to and staggered from the third side surface. The second side surface is adjacent to and staggered from the fourth side surface. At positions where the third side surface and the fourth side surface are disposed, each of a side, proximal to the color film substrate, of the array substrate and a side, distal from
(Continued)

the color film substrate, of the array substrate includes a structure formed by a grinding process.

12 Claims, 5 Drawing Sheets

(51) Int. Cl.
*G02F 1/1339* (2006.01)
*G02F 1/1345* (2006.01)

(56) References Cited

U.S. PATENT DOCUMENTS

| | | |
|---|---|---|
| 2014/0133073 A1 | 5/2014 | Ahn et al. |
| 2016/0095206 A1 | 3/2016 | Lai et al. |
| 2017/0322435 A1 | 11/2017 | Yi et al. |
| 2018/0284529 A1* | 10/2018 | Sato ................. G02F 1/133512 |
| 2019/0187506 A1* | 6/2019 | Yun ..................... G02F 1/13452 |
| 2020/0320951 A1* | 10/2020 | Shin .................... G02F 1/13452 |
| 2021/0141263 A1 | 5/2021 | Sun et al. |

FOREIGN PATENT DOCUMENTS

| | | | | |
|---|---|---|---|---|
| CN | 104332108 A | | 2/2015 | |
| CN | 110722462 A | | 1/2020 | |
| CN | 110955356 A | | 4/2020 | |
| CN | 110967881 A | | 4/2020 | |
| CN | 210514867 U | | 5/2020 | |
| CN | 112130385 A | | 12/2020 | |
| CN | 212060825 U | | 12/2020 | |
| CN | 113199338 A | | 8/2021 | |
| CN | 216286064 U | | 4/2022 | |
| JP | 2004151551 A | | 5/2004 | |
| KR | 20050047881 A | | 5/2005 | |
| KR | 2014076319 A | * | 6/2014 | ....... G02F 1/133308 |

* cited by examiner

CURVED LIQUID CRYSTAL DISPLAY PANEL AND CURVED DISPLAY DEVICE

CROSS-REFERENCE TO RELATED APPLICATION

The present disclosure is a U.S. national stage of international application No. PCT/CN2022/113811, field on Aug. 22, 2022, which claims priority to Chinese Patent Application No. 202110998013.2, filed on Aug. 27, 2021, and entitled "CURVED LIQUID CRYSTAL DISPLAY PANEL AND CURVED DISPLAY DEVICE," the contents of which are herein incorporated by reference in their entireties.

TECHNICAL FIELD

The present disclosure relates to the field of display technologies, and in particular, relates to a curved liquid crystal display panel and a curved display device.

BACKGROUND OF THE INVENTION

At present, curved liquid crystal display panels are widely used in devices with display functions, such as televisions or computers.

SUMMARY OF THE INVENTION

Embodiments of the present disclosure provide a curved liquid crystal display panel and a curved display device. The technical solutions are as follows.

According to one aspect of the present disclosure, a curved liquid crystal display panel is provided. The curved liquid crystal display panel includes a color film substrate and an array substrate that are arranged opposite to each other; wherein a surface, distal from the array substrate, of the color film substrate is a display surface of the curved liquid crystal display panel, and the display surface is a concave display surface;

an orthographic projection of the color film substrate on the array substrate is within the array substrate;
the color film substrate includes a first side surface and a second side surface that are arranged opposite to each other, wherein the first side surface and the second side surface are both arc-shaped side surfaces; and
the array substrate includes a third side surface and a fourth side surface that are arranged opposite to each other, wherein the third side surface and the fourth side surface are both arc-shaped side surfaces;
wherein the first side surface is adjacent to and staggered from the third side surface, and the second side surface is adjacent to and staggered from the fourth side surface; and
at positions where the third side surface and the fourth side surface are disposed, each of a side, proximal to the color film substrate, of the array substrate and a side, distal from the color film substrate, of the array substrate includes a structure formed by a grinding process.

In some embodiments, the structure formed by the grinding process is a round corner or a chamfer.

In some embodiments, the curved liquid crystal display panel includes a display region and a non-display region disposed on a periphery of the display region; wherein the curved liquid crystal display panel further includes a side-coating adhesive within the non-display region and arranged around the color film substrate and the array substrate.

In some embodiments, the first side surface, the second side surface, the third side surface, and the fourth side surface are in contact with the side-coating adhesive, and the side-coating adhesive covers a protruding region of the array substrate, wherein the protruding region is a region, protruding from the color film substrate, of the side, proximal to the color film substrate, of the array substrate.

In some embodiments, the array substrate includes a plurality of bonding structures disposed within the non-display region, wherein an arrangement direction of the plurality of bonding structures is parallel to an extension direction of the third side surface, and the plurality of bonding structures are closer to the third side surface than to the fourth side surface.

In some embodiments, a vertical distance between the first side surface and the third side surface ranges from 2 mm to 2.5 mm; and
a vertical distance between the second side surface and the fourth side surface ranges from 0.3 mm to 1 mm.

In some embodiments, the color film substrate further includes a fifth side surface and a sixth side surface that are arranged opposite to each other, wherein the fifth side surface and the sixth side surface are both rectangular side surfaces; and
the array substrate further includes a seventh side surface and an eighth side surface that are arranged opposite to each other, wherein the seventh side surface and the eighth side surface are both rectangular side surfaces;
wherein the fifth side surface is coplanar with the seventh side surface, and the sixth side surface is coplanar with the eighth side surface.

In some embodiments, the curved liquid crystal display panel further includes a liquid crystal layer disposed between the array substrate and the color film substrate.

In some embodiments, the curved liquid crystal display panel further includes a first polarizer and a second polarizer;
wherein the first polarizer is disposed on a side, distal from the array substrate, of the color film substrate, and the second polarizer is disposed on a side, distal from the color film substrate, of the array substrate.

According to another aspect of the present disclosure, a curved display device is provided. The curved display device includes the curved liquid crystal display panel as described above and a backlight module.

BRIEF DESCRIPTION OF DRAWINGS

For clearer descriptions of the technical solutions in the embodiments of the present disclosure, the following briefly introduces the accompanying drawings to be required in the descriptions of the embodiments. Apparently, the accompanying drawings in the following description show merely some embodiments of the present disclosure, and persons of ordinary skills in the art may still derive other drawings from these accompanying drawings without creative efforts.

Figure 1:
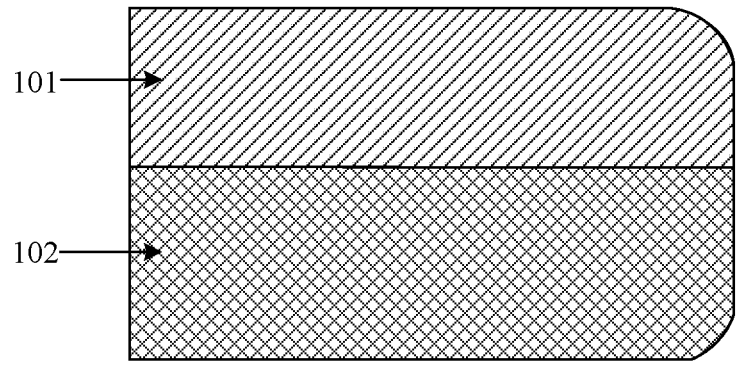
FIG. 1 is a schematic structural diagram of a curved liquid display panel.

Definite embodiments of the present disclosure illustrated by the above accompanying drawings will be described in greater detail hereinafter. These accompanying drawings and textual descriptions are not intended to limit the scope of the concept of the present disclosure in any form, but rather to illustrate the concept of the present disclosure for those skilled in the art by referring to particular embodiments.

DETAILED DESCRIPTION

The present disclosure is described in further detail with reference to the accompanying drawings, to clearly present the objects, technical solutions, and advantages of the present disclosure.

A curved liquid crystal display panel includes a color film substrate and an array substrate that are arranged opposite to each other. The curved liquid crystal display panel is typically acquired by cutting a display mother panel with a large area and then bending the cut mother panel.

However, as for a flat liquid crystal display panel acquired by cutting the mother panel, edges of the array substrate in the flat liquid crystal display panel are highly prone to cutting-induced micro-cracks. Therefore, during a process of assembling the flat liquid crystal display panel in a curved display device by bending the flat liquid crystal display panel, the micro-cracks at the edges of the curved liquid crystal display panel are likely to expand, which leads to fracture of the array substrate, and thus the product yield of the curved display device is affected.

With the development of display technology, there are more and more curved display devices. The curved display device refers to a display device, of which a display surface has a curvature, that is, a display device with a curved shape. Typically, the curvature of the curved display device is basically consistent with a curvature of a human eye. For example, using a curved television as an example, the curved TV coincides with an arc-shaped structure of the human eye, and thus is more suitable for the shape of the human eye in terms of ergonomics, such that different positions on the curved display surface have equal distances to the human eye, which eliminates visual distortion in edges of a flat display surface. Moreover, the display surface of the curved TV achieves a better viewing angle, and thus users viewing the curved TV have more comfortable viewing experiences.

At present, the manufacturing of a curved liquid crystal display panel is one of the important steps in a manufacturing process of the curved device. The curved liquid crystal display panel is typically acquired by cutting a large-area display mother panel to form a flat liquid crystal display panel and then bending the flat liquid crystal display panel. During the cutting process, edges of the cut flat liquid crystal display panel are prone to micro-cracks, and the curved liquid crystal display panel with the micro-cracks has lower strength and is prone to the risk of fracture. Therefore, the cut flat liquid crystal display panel typically needs to be ground by a grinding tool to eliminate the micro-cracks at the edges of the curved liquid crystal display panel.

FIG. 1 is a schematic structural diagram of a curved liquid crystal display panel. As illustrated in FIG. 1, the curved liquid crystal display panel 10 includes a color film substrate 101 and an array substrate 102 that are arranged opposite to each other. Because edges of the color film substrate 101 and the array substrate 102 are highly prone to micro-cracks upon the completion of the cutting process, the edges of the color film substrate 101 and the array substrate 102 in the display panel 10 are ground by a grinding process, such that the micro-cracks at the edges of the color film substrate 101 and the array substrate 102 are eliminated.

However, edges, at positions other than bonding positions, of the color film substrate 101 and the array substrate 102 in the curved liquid crystal display panel 10 are flush. Therefore, in the case that the curved liquid crystal display panel 10 is in a flat state, only an edge of a side, distal from the array substrate 102, of the color film substrate 101 and an edge of a side, distal from the color film substrate 101, of the array substrate 102 are capable of being adequately ground by the grinding process; and an edge of a side, proximal to the array substrate 102, of the color film substrate 101 and an edge of a side, proximal to the color film substrate 101, of the array substrate 102 fail to be adequately ground.

In the case that the curved liquid crystal display panel 10 is assembled to a curved display device in the subsequent process, a display surface of the curved display device is usually a concave display surface, and the array substrate 102 is distal from a display surface of the display panel 10 relative to the color film substrate 101. Therefore, a bending stress on the array substrate 102 is greater than a bending stress on the color film substrate 101. As a consequence, in the case that the edge of the side, proximal to the color film substrate 101, of the array substrate 102 is not adequately ground, the micro-cracks at the edge of the side, proximal to the color film substrate 101, of the array substrate 102 are further expanded under the influence of the bending stress, which easily leads to fracture of the array substrate 102, and thus the yield of the curved display device is low.

Embodiments of the present disclosure provide a curved liquid crystal display panel and a curved display device, which solve the problem described above in some practices.

Figure 2:
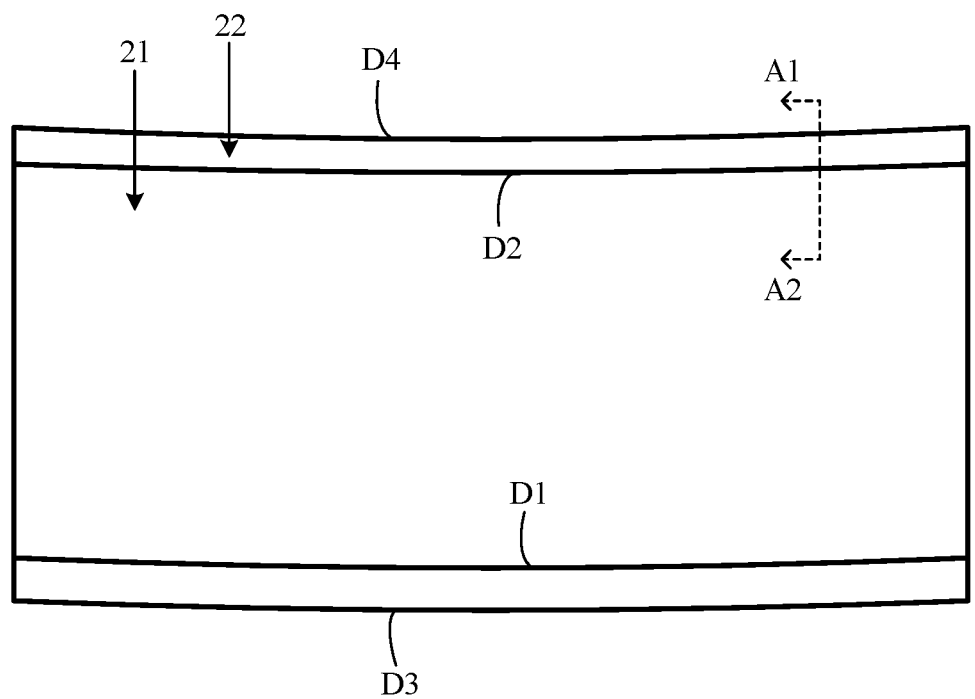
FIG. 2 is a top view of a curved liquid display panel according to some embodiments of the present disclosure.
Figure 3:
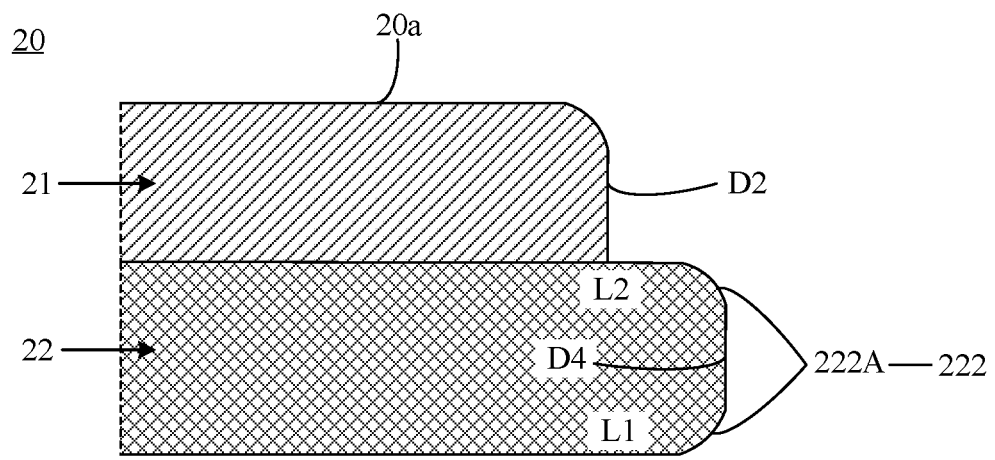
FIG. 3 is a sectional diagram of the curved liquid display panel illustrated in FIG. 2 along an A1-A2 line.

FIG. 2 is a top view of a curved liquid display panel according to some embodiments of the present disclosure, and FIG. 3 is a sectional diagram of the curved liquid display panel illustrated in FIG. 2 along an A1-A2 line. Referring to FIG. 2 and FIG. 3, the curved liquid crystal display panel 20 includes a color film substrate 21 and an array substrate 22 that are arranged opposite to each other. A surface, distal from the array substrate 22, of the color film substrate 21 is a display surface 20a of the curved liquid crystal display panel 20, and the display surface 20a is a concave display surface. That is, the array substrate 22 is distal from the display surface 20a of the curved liquid crystal display panel 20 relative to the color film substrate 21. The display surface 20a of the curved liquid crystal display panel 20 is a surface that displays images and faces toward users who view the curved liquid crystal display panel 20.

In some embodiments, an orthographic projection of the color film substrate 21 on the array substrate 22 is within the array substrate 22. That is, an area of a surface, proximal to the array substrate 22, of the color film substrate 21 is smaller than an area of a surface, proximal to the color film substrate 21, of the array substrate 22.

The color film substrate 21 includes a first side surface D1 and a second side surface D2 that are arranged opposite to each other. The first side surface D1 and the second side surface D2 are both arc-shaped side surfaces. The array substrate 22 includes a third side surface D3 and a fourth side surface D4 that are arranged opposite to each other. The third side surface D3 and the fourth side surface D4 are both arc-shaped side surfaces.

The first side surface D1 of the color film substrate 21 is adjacent to and staggered from the third side surface D3 of the array substrate 22. The second side surface D2 of the color film substrate 21 is adjacent to and staggered from the fourth side surface D4 of the array substrate 22.

At positions where the third side surface D3 and the fourth side surface D4 of the array substrate 22 are disposed, each of a side, proximal to the color film substrate 21, of the array substrate 22 and a side, distal from the color film substrate 21, of the array substrate 22 has a structure 222 formed by a grinding process.

In the present disclosure, the display surface 20a of the curved liquid crystal display panel 20 is the concave display surface, and the array substrate 22 in the curved liquid crystal display panel 20 is distal from, relative to the color film substrate 21, the display surface 20a of the curved liquid crystal display panel 20. Therefore, a bending stress to which the array substrate 22 is subjected is greater than a bending stress to which the color film substrate 21 is subjected. Moreover, the orthographic projection of the color film substrate 21 on the array substrate 22 is within the array substrate 22, the first side surface D1 of the color film substrate 21 is staggered from the third side surface D3 of the array substrate 22, and the second side surface D2 of the color film substrate 21 is staggered from the fourth side surface D4 of the array substrate 22. Therefore, at the positions where the third side surface D3 and the fourth side surface D4 of the array substrate 22 are disposed, the side, proximal to the color film substrate 21, of the array substrate 22 and the side, distal from the color film substrate 21, of the array substrate 22 are both capable of being adequately ground, and thus micro-cracks at an edge of the side, proximal to the color film substrate 21, of the array substrate 22 and an edge of the side, distal from the color film substrate 21, of the array substrate 22 are eliminated. In this way, the problem of the expansion of the micro-cracks occurring in the case that the array substrate 22 in the curved liquid crystal display panel 20 is subjected to the large bending stress is effectively addressed, such that the probability of fracture occurring to the array substrate 22 is reduced, and thus the product yield of the curved display device with the curved liquid crystal display panel 20 integrated is improved.

In summary, some embodiments of the present disclosure provide the curved liquid crystal display panel, including the color film substrate and the array substrate. By arranging the two arc-shaped side surfaces of the color film substrate to be respectively staggered from the two arc-shaped side surfaces of the adjacent array substrate, at the positions where the two arc-shaped side surfaces of the array substrate are disposed, the side, proximal to the color film substrate, of the array substrate and the side, distal from the color film substrate, of the array substrate are both capable of being adequately ground, and thus the micro-cracks at the edge of the side, proximal to the color film substrate, of the array substrate and the edge of the side, distal from the color film substrate, of the array substrate are eliminated. In this way, the problem of the expansion of the micro-cracks occurring in the case that the array substrate in the curved liquid crystal display panel is subjected to the large bending stress is effectively addressed, such that the probability of the fracture occurring to the array substrate is reduced, and thus the product yield of the curved display device with the curved liquid crystal display panel integrated is improved.

Optionally, as illustrated in FIG. 3, at positions where the third side surface (not illustrated in FIG. 3) and the fourth side surface D4 of the array substrate 22 are disposed, the structure 222 formed by the grinding process on each of the side, proximal to the color film substrate 21, of the array substrate 22 and the side, distal from the color film substrate 21 of the array substrate 22 is a round corner 222A. The round corner 222A refers to a smooth transition effect created between two adjacent surfaces. That is, an original corner is replaced by a segment of arc that is tangential to both sides of the original corner. A size of the round corner 222A is expressed in terms of a radius of the arc. Exemplarily, a radius of the round corner 222A ranges from 0.15 mm to 0.4 mm. It should be noted that the radius of the round corner 222A may be other values, such as 0.6 mm, which is not limited herein.

In this way, connections between the third side surface (not illustrated in FIG. 3) and the fourth side surface D4 of the array substrate 22 and a surface L1 of the array substrate 22 and a second surface L2 of the array substrate 22 are round and smooth. The first surface L1 of the array substrate 22 refers to a surface of a side, distal from the color film substrate 21, of the array substrate 22, and the second surface L2 of the array substrate 22 refers to a surface of a side, proximal to the color film substrate 21, of the array substrate 22.

By trimming the positions where the third side surface (not illustrated in FIG. 3) and the fourth side surface D4 of the array substrate 22 are disposed by the grinding process, the micro-cracks at the edge of the side, proximal to the color film substrate 21, of the array substrate 22 and the edge of the side, distal from the color film substrate 21, of the array substrate 22 are eliminated. In this way, the problem of the expansion of the micro-cracks occurring in the case that the array substrate 22 of the curved liquid crystal display panel 20 is subjected to the large bending stress is effectively addressed, and thus the fracture occurring to the array substrate 22 due to the bending stress is effectively avoided. That is, the round corner 222A avoids stress concentration at the edge of the side, proximal to the color film substrate 21, of the array substrate 22 and at the edge of the side, distal from the color film substrate 21, of the array substrate 22, which improves the strength of the array substrate 22. Moreover, a volume of a portion, ground off by the grinding process, of a second target side surface of the array substrate 22 is controlled by controlling the radius of the arc of the round corner 222A.

Figure 4:
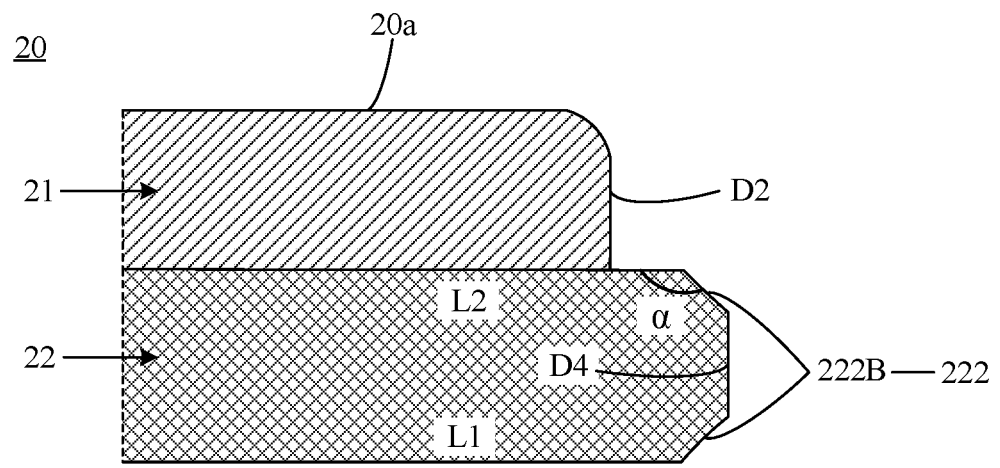
FIG. 4 is a schematic structural diagram of another curved liquid display panel according to some embodiments of the present disclosure.

FIG. 4 is a schematic structural diagram of another curved liquid display panel according to some embodiments of the present disclosure. Alternatively, in some embodiments, as illustrated in FIG. 4, at the position where the third side surface (not shown in FIG. 4) and the fourth side surface D4 of the array substrate 22 are disposed, the structure 222 formed by the grinding process on each of the side, proximal to the color film substrate 21, of the array substrate 22 and the side, distal from the color film substrate 21, of the array substrate 22 is a chamfer 222B. The chamfer 222B refers to a structure of an inclined surface acquired by processing a corner, at the second target side surface, of the array substrate 22 by the grinding process. The micro-cracks at the edge of the side, proximal to the color film substrate 21, of the array substrate 22 and at the edge of the side, distal from the color film substrate 21, of the array substrate 22 are eliminated by the chamfer 222B. In this way, the problem of the expansion of the micro-cracks occurring in the case that the array substrate 20 of the curved liquid crystal display panel 20 is subjected to the large bending stress is effectively addressed, and thus the fracture of the array substrate 22 due to the bending stress is effectively avoided. An angle α between the inclined surface of the chamfer 222B and the first surface L1 of the array substrate 22 is 135 degrees. It should be noted that the angle α may be other angles, such as 140 degrees, which is not limited herein.

Figure 5:
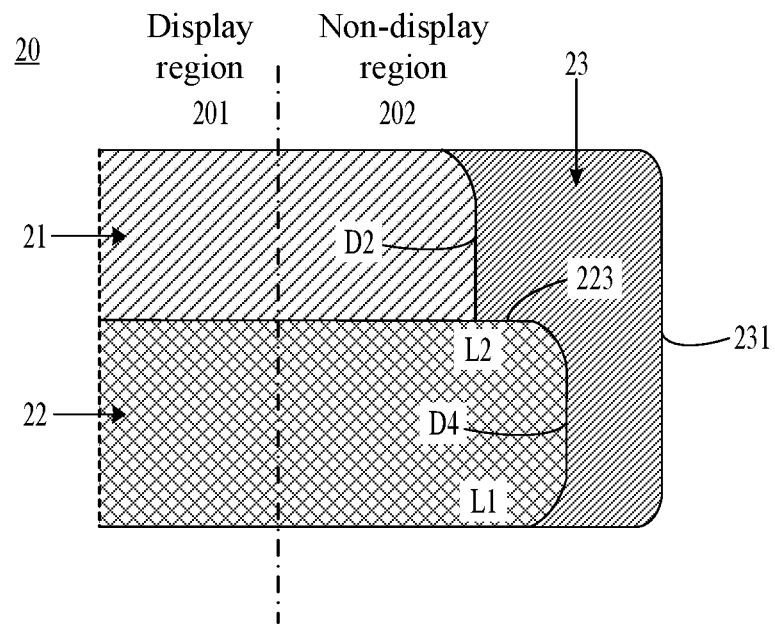
FIG. 5 is a schematic structural diagram of still another curved liquid display panel according to some embodiments of the present disclosure.

FIG. 5 is a schematic structural diagram of still another curved liquid display panel according to some embodiments of the present disclosure. In some embodiments, as illustrated in FIG. 5, the curved liquid crystal display panel 20 includes a display region 201 and a non-display region 202 disposed on a periphery of the display region 201. The curved liquid crystal display panel 20 also includes a side-coating adhesive 23 disposed within the non-display region 202 of the curved liquid crystal display panel 20 and arranged around the color film substrate 21 and the array substrate 22. The side-coating adhesive 23 is configured to coat a periphery of the color film substrate 21 and the array substrate 22. Further, the side-coating adhesive 23 is made of a black light-shielding material, which is used to avoid light leakage of the periphery of the color film substrate 21 and the array substrate 22.

Optionally, as illustrated in FIG. 5, the first side surface (not illustrated in FIG. 5) and the second side surface D2 of the color film substrate 21, and the third side surface (not illustrated in FIG. 5) and the fourth side surface D4 of the array substrate 22 are in contact with the side-coating adhesive 23. The side-coating 23 covers a protruding region 223 of the array substrate 22. The protruding region 223 is a region, protruding from the color film substrate 21, of the side, proximal to the color film substrate 21, of the array substrate 22.

Further, the side-coating adhesive 23 includes a first target side surface 231 distal from the color film substrate 21 and the array substrate 22. A minimum distance between the second side surface D2 of the color film substrate 21 and the first target side surface 231 of the side-coating adhesive 23 is greater than a minimum distance between the fourth side surface D4 of the array substrate 22 and the first target side surface 231 of the side-coating adhesive 23.

The side-coating adhesive 23 further includes a second target side surface (not shown in FIG. 5) corresponding to the first target side surface 231. A minimum distance between the first side surface of the color film substrate 21 and the second target side surface of the side-coating adhesive 23 is greater than a minimum distance between the third side surface of the array substrate 22 and the second target side surface of the side-coating adhesive 23.

In this way, the side-coating adhesive 23 supports the periphery of the color film substrate 21 and the array substrate 22, an overhang structure is prevented from being formed between the fourth side surface D4 of the array substrate 22 and the second side surface D2 of the color film substrate 21, and an overhang structure is prevented from being formed between the third side surface of the array substrate 22 and the first side surface of the color film substrate 21. Moreover, the side-coating adhesive 23 strengthens the connection between the color film substrate 21 and the array substrate 22.

Optionally, the side-coating adhesive 23 is made of a pressure sensitive adhesive (PSA). Alternatively, the side-coating adhesive 23 is made of an ultraviolet ray (UV) curable adhesive, which is an adhesive that cures by irradiation of ultraviolet light and is used as an adhesive. The material of the UV curable adhesive includes a photoinitiator (or photosensitizer). The photoinitiator absorbs UV light under the irradiation of UV rays and generates reactive radicals or cations, which trigger monomer polymerization and cross-linking chemical reactions, such that the adhesive is transformed from liquid to solid in a few seconds. Therefore, upon coating of the liquid UV curable adhesive on the periphery of the color film substrate 21 and the array substrate 22, the UV curable adhesive is solidified by irradiating the liquid UV curable adhesive using UV light.

It should be noted that the side-coating adhesive 23 in some embodiments of the present disclosure includes adhesives of other materials, which is not limited herein.

Figure 6:
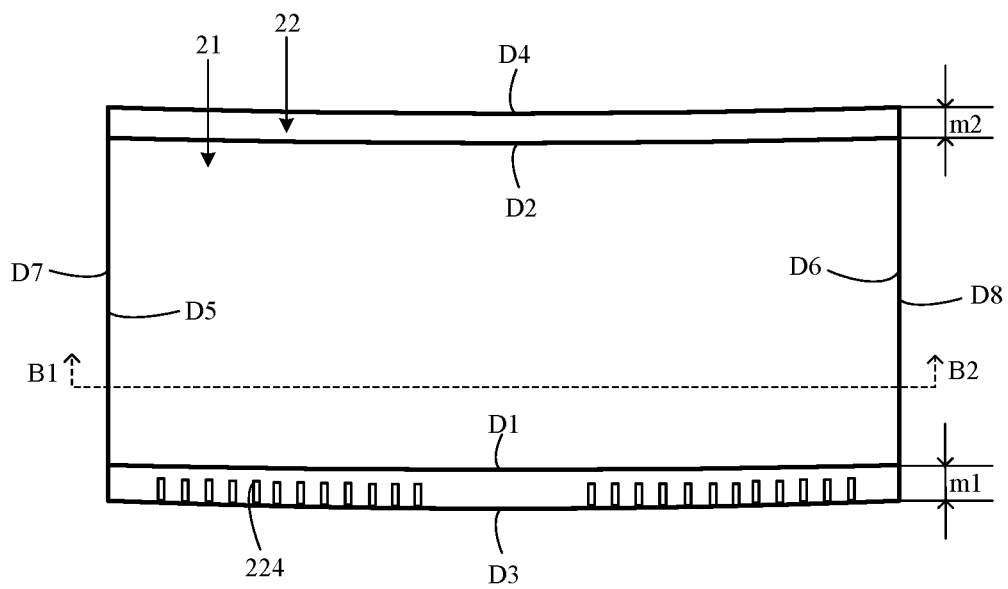
FIG. 6 is a schematic structural diagram of still another curved liquid display panel according to some embodiments of the present disclosure.

FIG. 6 is a schematic structural diagram of still another curved liquid display panel according to some embodiments of the present disclosure. In some embodiments, the array substrate 22 includes a plurality of bonding structures 224 within the non-display region. An arrangement direction of the plurality of bonding structures 224 is parallel to an extension direction of the third side surface D3 of the array substrate 22. The plurality of bonding structures 224 are closer to the third side surface D3 of the array substrate 22 than to the fourth side surface D4 of the array substrate. The plurality of bonding structures 224 are electrically connected to a plurality of thin-film transistors on the array substrate 22.

Optionally, the curved liquid crystal display panel 20 further includes a chip on film (COF) and a printed circuit board (PCB). The bonding structure 224 is connected to an integrated chip (IC) by the COF and the PCB to input a drive signal to the curved liquid crystal display panel. The drive signal controls deflections of liquid crystal molecules in a liquid crystal layer 30 by the thin-film transistors on the array substrate 22, such that the curved liquid crystal display panel displays images. The bonding structure 224 is connected to the COF by an anisotropic conductive adhesive (ACF) for fixing and conduction.

Optionally, as illustrated in FIG. 6, a vertical distance m1 between the first side surface of the color film substrate 21 and the third side surface D3 of the array substrate 22 ranges from 2 mm to 2.5 mm; and a vertical distance m2 between the second side surface D2 of the color film substrate 21 and the fourth side surface of the array substrate 22 ranges from 0.3 mm to 1 mm. Within this range, in one aspect, the micro-cracks in the array substrate 22 at the third side surface D3 and the fourth side surface D4 are eliminated by the grinding tool used in the grinding process; and in another aspect, the third side surface D3 and the fourth side surface D4 in the array substrate 22 are prevented from being excessively ground by the grinding tool. Moreover, the color film substrate 21 is inward shrunken by 0.3 mm to 1 mm compared to the array substrate 22, which avoids an effect on a width of a frame of the curved liquid crystal display panel 20.

Optionally, as illustrated in FIG. 6, the color film substrate 21 further includes a fifth side surface D5 and a sixth side surface D6 that are arranged opposite to each other. The fifth side surface D5 and the sixth side surface D6 are both rectangular side surfaces. Both the fifth side surface D5 and the sixth side surface D6 are connected to the first side surface D1 and the second side surface D2 of the color film substrate 21.

The array substrate 22 further includes a seventh side surface D7 and an eighth side surface D8 that are arranged opposite to each other. The seventh side surface D7 and the eighth side surface D8 are both rectangular side surfaces. And both the seventh side surface D7 and the eighth side surface D8 are connected to the third side surface D3 and the fourth side surface D4 of the array substrate 22.

The fifth side surface D5 of the color film substrate 21 is coplanar with the seventh side surface D7 of the array substrate 22, and the sixth side surface D6 of the color film substrate 21 is coplanar with the eighth side surface D8 of the array substrate 22.

Figure 7:
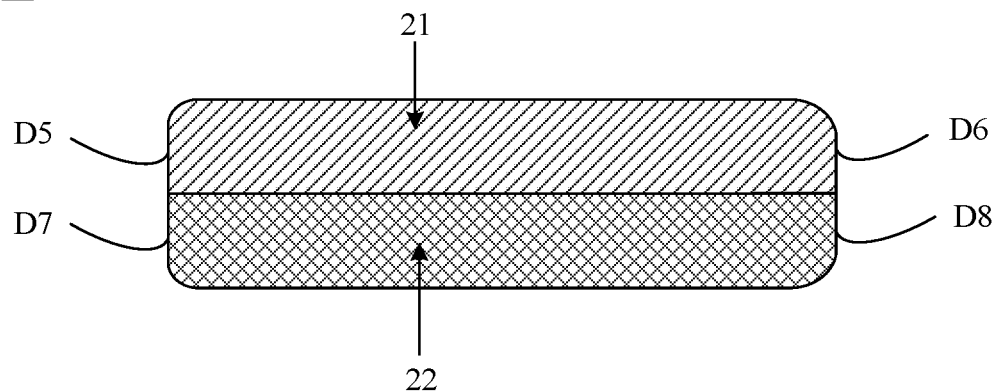
FIG. 7 is a sectional diagram of the curved liquid display panel illustrated in FIG. 6 along a B1-B2 line.

FIG. 7 is a sectional diagram of the curved liquid display panel illustrated in FIG. 6 along a B1-B2 line. In some embodiments, as illustrated in FIG. 7, the fifth side surface D5 and the sixth side surface D6 of the color film substrate 21 and the seventh side surface D7 and the eighth side surface D8 of the array substrate 22 remain in the flat state, i.e., the fifth side surface D5 and the sixth side surface D6 of the color film substrate 21 and the seventh side surface D7 and the eighth side surface D8 of the array substrate 22 are unaffected by the bending stress. Therefore, the color film substrate 21 and the array substrate 22 are flush at positions of the fifth side surface D5 and the seventh side surface D7, and the color film substrate 21 and the array substrate 22 are flush at positions of the sixth side surface D6 and the eighth side surface D8. In this way, the frame of the curved liquid crystal display panel 22 is narrow.

In some embodiments, the curved liquid crystal display panel further includes a liquid crystal layer disposed between the array substrate and the color film substrate.

The array substrate is a thin-film transistor array substrate, which includes a base substrate and a plurality of pixel units disposed on the base substrate. Each of the pixel units includes a thin-film transistor and a pixel electrode that are connected to each other.

The color film substrate includes a transparent substrate and a black matrix and a color filter layer that are disposed on the transparent substrate. The color filter layer includes three color filter units of red, green, and blue. The black matrix (a black opaque substance) is disposed between the three color filter units, which avoids light leakage from the color film substrate and thus electro-optical characteristics of the thin-film transistors on the thin-film transistor array substrate are unaffected.

The liquid crystal layer is made of liquid crystals (LC). The liquid crystal is a substance that has both properties of a liquid and a crystal in a temperature range. In other words, the liquid crystal, in a molten state or upon being dissolved by a solvent, loses the rigidity of a solid substance but acquires the fluidity of a liquid, and part of the crystalline substance molecules remains the anisotropic ordered arrangement, which forms an intermediate state that has part of properties of both a crystal and a liquid. In the case that the temperature rises, the liquid crystal turns into a clarified and homogeneous liquid as the temperature rises. Conversely, during solidifying from a liquid to a solid, the liquid crystal also goes through the intermediate state.

The curved liquid crystal display panel controls rotation directions of the liquid crystal molecules in the liquid crystal layer by applying a drive voltage on the array substrate and color film substrate, such that light passing through the curved liquid crystal display panel is refracted to produce images. The curved surface liquid crystal display panel is widely used in the display field because of its advantages such as high resolution, light weight, low energy consumption, and low radiation.

Optionally, the curved liquid crystal display panel includes a frame sealant. As described above, the array substrate and the color film substrate are arranged opposite to each other, and the liquid crystal layer is provided between the color film substrate and the array substrate. The frame sealant is disposed at a periphery of the liquid crystal layer to connect the array substrate to the color film substrate, such that the array substrate and the color film substrate are stacked to form a sealed liquid crystal box.

It should be noted that in other embodiments, the array substrate is closer to the display surface of the curved liquid crystal display panel than to the color film substrate.

Figure 8:
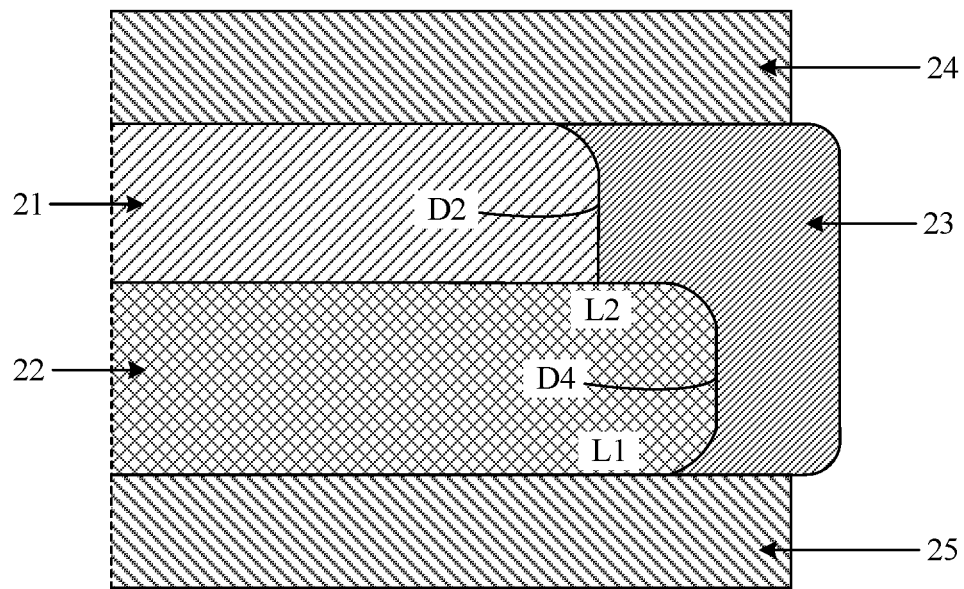
FIG. 8 is a schematic structural diagram of still another curved liquid display panel according to some embodiments of the present disclosure.

FIG. 8 is a schematic structural diagram of still another curved liquid display panel according to some embodiments of the present disclosure. As illustrated in FIG. 8, the curved liquid crystal display panel 20 further includes a first polarizer 24 and a second polarizer 25. The first polarizer 24 and the second polarizer 25 are capable of controlling a polarization direction of a particular light beam. Both the first polarizer 24 and the second polarizer 25 include a polyvinyl alcohol (PVA) film, a cellulose tri-acetate (TAC) film, a protective film, and a pressure sensitive adhesive.

The first polarizer 24 is disposed on the side, distal from the array substrate 22, of the color film substrate 21, and the second polarizer 25 is disposed on the side, distal from the color film substrate 21, of the array substrate 22. The first polarizer 24 and the second polarizer 25 are respectively disposed on two sides of the color film substrate 21 and the array substrate 22. The second polarizer 25 is configured to convert a light beam received by the curved liquid crystal display panel 20 into polarized light, and the first polarizer 24 is configured to resolve the polarized light that has been modulated by the liquid crystal layer in the color film substrate 21 and the array substrate 22 to generate a light and dark contrast, and thus display images are generated.

In summary, some embodiments of the present disclosure provide the curved liquid crystal display panel, including the color film substrate and the array substrate. By arranging the two arc-shaped side surfaces of the color film substrate to be respectively staggered from the two arc-shaped side surfaces of the adjacent array substrate, at the positions where the two arc-shaped side surfaces of the array substrate are disposed, the side, proximal to the color film substrate, of the array substrate and the side, distal from the color film substrate, of the array substrate are both capable of being adequately ground, and thus the micro-cracks at the edge of the side, proximal to the color film substrate, of the array substrate and the edge of the side, distal from the color film substrate, of the array substrate are eliminated. In this way, the problem of the expansion of the micro-cracks occurring in the case that the array substrate in the curved liquid crystal display panel is subjected to the large bending stress is effectively addressed, such that the probability of the fracture occurring to the array substrate is reduced, and thus the product yield of the curved display device with the curved liquid crystal display panel integrated is improved.

Figure 9:
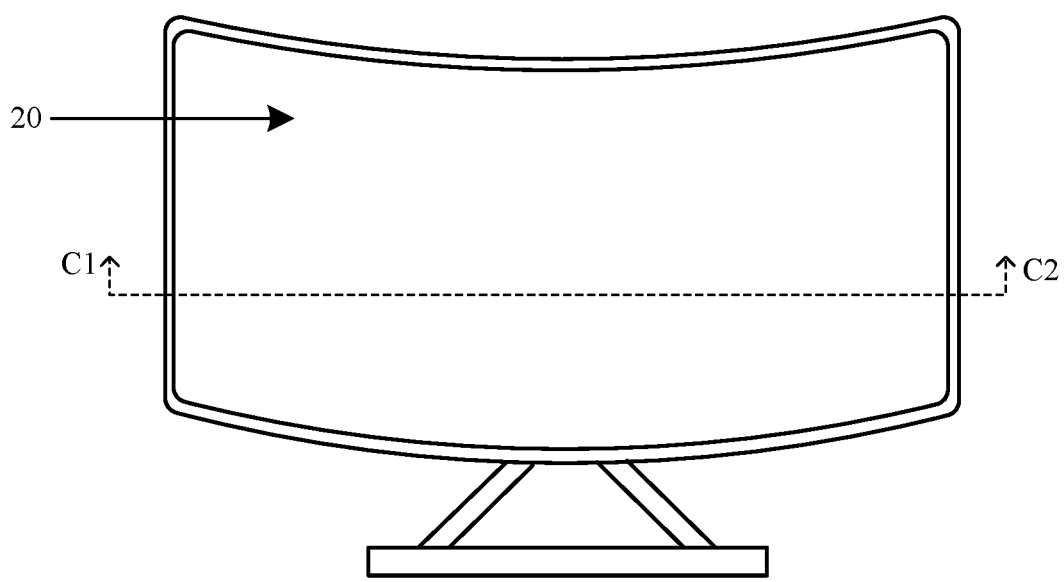
FIG. 9 is a schematic structural diagram of a curved liquid display device according to some embodiments of the present disclosure.

Some embodiments of the present disclosure further provide a curved display device. The curved display device is a product or a component with a concave display surface such as a curved television, a curved display, or a curved computer. FIG. 9 is a schematic structural diagram of a curved liquid display device according to some embodiments of the present disclosure. As illustrated in FIG. 9, the curved display device 30 includes a curved liquid crystal display panel 20 and a backlight module (not illustrated in FIG. 9). The curved liquid crystal display panel 20 is the curved liquid crystal display panel 20 as described above.

Figure 10:
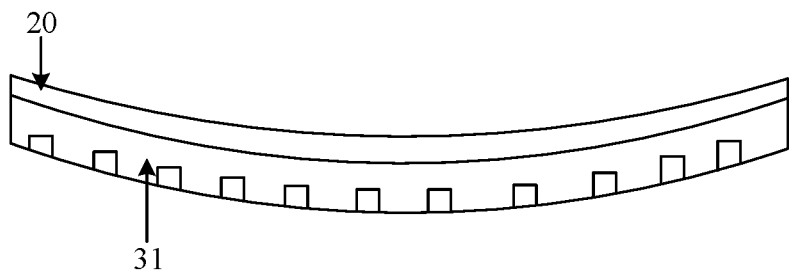
FIG. 10 is a sectional diagram of the curved liquid display device illustrated in FIG. 9 along a C1-C2 line.

FIG. 10 is a sectional diagram of the curved liquid display device illustrated in FIG. 9 along a C1-C2 line. As illustrated in FIG. 10, the backlight module 31 is a direct backlight module. The direct type backlight module has the same curvature as the curved liquid crystal display panel 20, such that the intensity of the light received at various positions of the curved liquid crystal display panel 20 is uniform.

Optionally, the backlight module 31 is a side-edge backlight module, which is not limited herein.

It should be noted that in the accompanying drawings, the sizes of layers and regions may be exaggerated for clearer illustration. It should be understood that where an element or layer is referred to as being "on" another element or layer, the element or layer may be directly on another element, or intervening layers therebetween may be present. In addition, it should be understood that where an element or layer is referred to as being "under" another element or layer, the element or layer may be directly under the other element, or there may be more than one intervening layer or element. In addition, it may be further understood that in the case that a layer or element is referred to as being "between" two layers or two elements, the layer may be the only layer between the two layers or two elements, or more than one intervening layer or element may further be present. Like reference numerals indicate like elements throughout.

In the present disclosure, the terms "first," "second," "third," "fourth," "fifth," "seventh," and "eighth" are only used for descriptive purposes, and cannot be understood as indicating or implying relative importance. The term "a plurality of" refers to two or more, unless expressly defined otherwise.

Described above are merely exemplary embodiments of the present disclosure, and are not intended to limit the present disclosure. Therefore, any modifications, equivalent substitutions, improvements, and the like made within the spirit and principles of the present disclosure shall be included in the protection scope of the present disclosure.

What is claimed is:

1. A curved liquid crystal display panel, comprising: a color film substrate and an array substrate that are arranged opposite to each other; wherein
    a surface, distal from the array substrate, of the color film substrate is a display surface of the curved liquid crystal display panel, and the display surface is a concave display surface;
    an orthographic projection of the color film substrate on the array substrate is within the array substrate;
    the color film substrate comprises a first side surface and a second side surface that are arranged opposite to each other, wherein the first side surface and the second side surface are both arc-shaped side surfaces; and
    the array substrate comprises a third side surface and a fourth side surface that are arranged opposite to each other, wherein the third side surface and the fourth side surface are both arc-shaped side surfaces; wherein
    the first side surface is adjacent to and staggered from the third side surface, and the second side surface is adjacent to and staggered from the fourth side surface; and
    at positions where the third side surface and the fourth side surface are disposed, each of a side, proximal to the color film substrate, of the array substrate and a side, distal from the color film substrate, of the array substrate comprises a structure formed by a grinding process;
    the curved liquid crystal display panel has a display region and a non-display region disposed on a periphery of the display region;
    wherein the curved liquid crystal display panel further comprises a side-coating adhesive disposed within the non-display region and arranged around the color film substrate and the array substrate;
    wherein the array substrate comprises a plurality of bonding structures disposed within the non-display region, wherein an arrangement direction of the plurality of bonding structures is parallel to an extension direction of the third side surface, and the plurality of bonding structures are closer to the third side surface than to the fourth side surface;
    wherein a vertical distance between the first side surface and the third side surface ranges from 2 mm to 2.5 mm; and
    a vertical distance between the second side surface and the fourth side surface ranges from 0.3 mm to 1 mm.

2. The curved liquid crystal display panel according to claim 1, wherein the structure formed by the grinding process is a round corner or a chamfer.

3. The curved liquid crystal display panel according to claim 1, wherein the first side surface, the second side surface, the third side surface, and the fourth side surface are in contact with the side-coating adhesive, and the side-coating adhesive covers a protruding region of the array substrate, the protruding region being a region, protruding from the color film substrate, of the side, proximal to the color film substrate, of the array substrate.

4. The curved liquid crystal display panel according to claim 1, wherein
    the color film substrate further comprises a fifth side surface and a sixth side surface that are arranged opposite to each other, the fifth side surface and the sixth side surface being both rectangular side surfaces; and
    the array substrate further comprises a seventh side surface and an eighth side surface that are arranged opposite to each other, the seventh side surface and the eighth side surface being both rectangular side surfaces;
    wherein the fifth side surface is coplanar with the seventh side surface, and the sixth side surface is coplanar with the eighth side surface.

5. The curved liquid crystal display panel according to claim 4, further comprising: a liquid crystal layer disposed between the array substrate and the color film substrate.

6. The curved liquid crystal display panel according to claim 5, further comprising: a first polarizer and a second polarizer;
    wherein the first polarizer is disposed on a side, distal from the array substrate, of the color film substrate, and the second polarizer is disposed on a side, distal from the color film substrate, of the array substrate.

7. A curved display device, comprising: a curved liquid crystal display panel and a backlight module;
    wherein the curved liquid crystal display panel comprises: a color film substrate and an array substrate that are arranged opposite to each other; wherein
    a surface, distal from the array substrate, of the color film substrate is a display surface of the curved liquid crystal display panel, and the display surface is a concave display surface;

an orthographic projection of the color film substrate on the array substrate is within the array substrate;

the color film substrate comprises a first side surface and a second side surface that are arranged opposite to each other, wherein the first side surface and the second side surface are both arc-shaped side surfaces; and the array substrate comprises a third side surface and a fourth side surface that are arranged opposite to each other, wherein the third side surface and the fourth side surface are both arc-shaped side surfaces; wherein the first side surface is adjacent to and staggered from the third side surface, and the second side surface is adjacent to and staggered from the fourth side surface; and at positions where the third side surface and the fourth side surface are disposed, each of a side, proximal to the color film substrate, of the array substrate and a side, distal from the color film substrate, of the array substrate comprises a structure formed by a grinding process;

wherein the curved liquid crystal display panel has a display region and a non-display region disposed on a periphery of the display region; and the curved liquid crystal display panel further comprises a side-coating adhesive disposed within the non-display region and arranged around the color film substrate and the array substrate;

wherein the array substrate comprises a plurality of bonding structures disposed within the non-display region, wherein an arrangement direction of the plurality of bonding structures is parallel to an extension direction of the third side surface, and the plurality of bonding structures are closer to the third side surface than to the fourth side surface;

wherein a vertical distance between the first side surface and the third side surface ranges from 2 mm to 2.5 mm; and a vertical distance between the second side surface and the fourth side surface ranges from 0.3 mm to 1 mm.

8. The curved display device according to claim 7, wherein the structure formed by the grinding process is a round corner or a chamfer.

9. The curved display device according to claim 7, wherein the first side surface, the second side surface, the third side surface, and the fourth side surface are in contact with the side-coating adhesive, and the side-coating adhesive covers a protruding region of the array substrate, the protruding region being a region, protruding from the color film substrate, of the side, proximal to the color film substrate, of the array substrate.

10. The curved display device according to claim 7, wherein
- the color film substrate further comprises a fifth side surface and a sixth side surface that are arranged opposite to each other, the fifth side surface and the sixth side surface being both rectangular side surfaces; and
- the array substrate further comprises a seventh side surface and an eighth side surface that are arranged opposite to each other, the seventh side surface and the eighth side surface being both rectangular side surfaces;
- wherein the fifth side surface is coplanar with the seventh side surface, and the sixth side surface is coplanar with the eighth side surface.

11. The curved display device according to claim 10, wherein the curved liquid crystal display panel further comprises: a liquid crystal layer disposed between the array substrate and the color film substrate.

12. The curved display device according to claim 11, wherein the curved liquid crystal display panel further comprises: a first polarizer and a second polarizer;
- wherein the first polarizer is disposed on a side, distal from the array substrate, of the color film substrate, and the second polarizer is disposed on a side, distal from the color film substrate, of the array substrate.

\* \* \* \* \*